No. 637,830. Patented Nov. 28, 1899.
W. RITSCHARD.
POST HOLE DIGGER.
(Application filed Dec. 17, 1898.)
(No Model.)
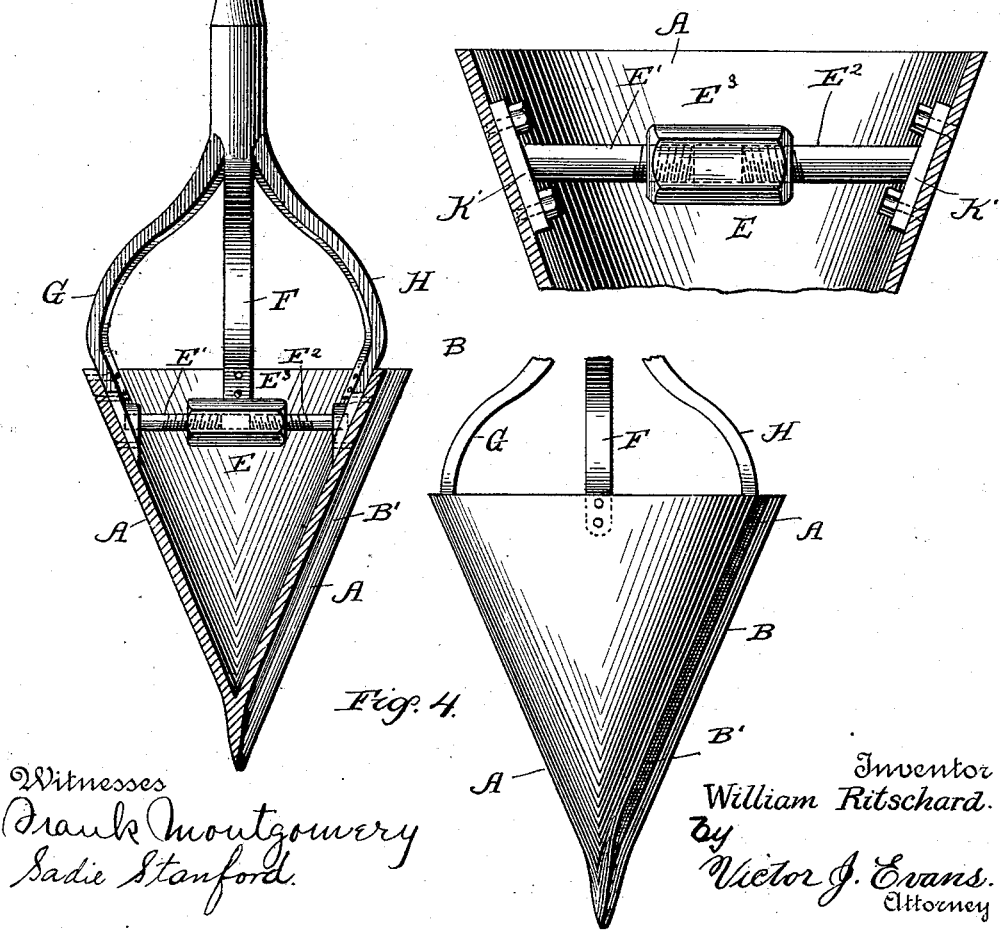

UNITED STATES PATENT OFFICE.

WILLIAM RITSCHARD, OF EAST ST. LOUIS, ILLINOIS.

POST-HOLE DIGGER.

SPECIFICATION forming part of Letters Patent No. 637,830, dated November 28, 1899.

Application filed December 17, 1898. Serial No. 699,586. (No model.)

*To all whom it may concern:*

Be it known that I, WILLIAM RITSCHARD, a citizen of the United States, residing at East St. Louis, in the county of St. Clair and State of Illinois, have invented certain new and useful Improvements in Post-Hole Diggers; and I do hereby declare the following to be a full, clear, and exact description of the invention, such as will enable others skilled in the art to which it appertains to make and use the same.

My invention relates to an improvement in devices for digging post-holes and other similar excavations; and my object has been to construct a tool for this purpose which will operate upon the principle of a boring-tool, be readily operated by hand, and will cut and collect the soil in the same operation, thus readily permitting the lifting of all the cut soil from the hole at any time or as the receptacle therefor becomes filled.

To this end the invention primarily consists in a hollow cone slit so as to present a cutting edge and having a handle secured thereto, so that as pressure is applied to the tool by the foot or otherwise it may be turned to cut the soil and fill therewith as a result of the cutting.

The invention more specifically consists in a spirally-formed hollow cone having one end thereof overlapping the other and formed into a cutting edge and at such a distance from the inner or overlapped end as to form a passage for the cut earth into the cone.

Further, the invention consists in means for adjusting the overlapping ends to and from each other, whereby to regulate the space between the same as the character of the soil being cut may require.

In the accompanying drawings, illustrating my invention, Figure 1 is a view in elevation, showing a vertical section of the cutter-cone, taken on the line 1 1, Fig. 2; Fig. 2, a top or plan view showing a horizontal section taken through the handle of the tool on the line 2 2 of Fig. 1; Fig. 3, a transverse vertical sectional view of the cutter-cone, showing a modification in the manner of attaching the adjustable stay-bolt within the cone; and Fig. 4, a side elevation of the cutter-cone.

Referring to the drawings, A indicates the tool proper, which is in the form of an inverted hollow cone slitted from top to bottom and bent or formed on the line of the spiral, as shown in Fig. 2, the dotted line showing the true circle. By this spiral formation a projecting inclined edge B is presented, which is beveled, as at B', to form a cutting edge. The interior edge C is carried slightly past the cutting edge, so that there may be a sufficient overlapping of the cone at this point to form a more readily controllable guide-opening for the soil to enter the cone as it is cut, and at the same time to more effectually prevent the cut soil from escaping therefrom when the tool is being lifted from the hole in which it has been operating.

The curved face of the cone, particularly that portion immediately in front of the cutting edge, (designated by D,) has a guiding function with reference to the cutter and limits not only the depth of the cut, but insures the proper curve of the cutter's travel by its engagement with the side of the hole being dug.

Within the cone and near its top there is secured a stay-bolt E, extending across the same from the interior overlapping portion to provide a brace for the cone at this point, while the three arms F, G, and H of handle I form a substantial brace of the exterior overlapping portion of the cone through the attachment of arm H at that point.

In addition to the bracing function of the bolt E, I have provided means for adjusting the interior overlapping portion of the cone to and from the cutting edge, whereby to limit or increase the depth of the cutting through the influence of the guide-surface D heretofore especially referred to and as the character of the soil operated in and the strength of the operator may determine. This means comprises an adjustable stay-bolt and is preferably formed in two sections E' and $E^2$, having their ends provided with right and left hand screw-threads, respectively, and connected by means of an adjusting-nut $E^3$, provided with right and left hand threads. The bolt-sections are secured within the cone by means of brackets K, attached by rivets at the sides of the cone, as shown in Figs. 1 and 2, or they may be formed integral with the plate K', as shown in the modified form illustrated in Fig. 3, and held in place by screws.

The tool is operated by turning the crossbar L, applying the weight of the operator at the same time either upon the cone with the foot, as in spading, or directly upon the crossbar, as may be found convenient and desirable.

Having thus described my invention, what I claim, and desire to secure by Letters Patent, is—

In a post-hole digger, the combination of a tool proper consisting of an inverted hollow cone slitted from the top to bottom and bent in the form of a spiral and providing an outer projecting inclined cutting edge extending over the inner edge, a bracing and adjusting bolt formed in two sections having their outer ends connected to the upper portion of the said inner edge and also to a diametrically opposite part of the body of the tool proper, the inner ends of bolt-sections being screw-threaded and adjustably received by a turnbuckle having angular faces, and a handle attached to the upper end of the tool proper.

In testimony whereof I affix my signature in presence of two witnesses.

WILLIAM RITSCHARD.

Witnesses:
 JOHN RITSCHARD,
 H. R. EICHENBERGER.